US008860372B2

(12) United States Patent
Guang et al.

(10) Patent No.: US 8,860,372 B2
(45) Date of Patent: Oct. 14, 2014

(54) MULTIPLE CELL BATTERY CHARGER CONFIGURED WITH A PARALLEL TOPOLOGY

(71) Applicant: ICC-Nexergy, Inc., Westchester, IL (US)

(72) Inventors: Haung Tai Guang, Guangzhou (CN); Li Wen Hua, Huayang Town (CN); Robert F. Wentink, Chicago, IL (US)

(73) Assignee: ICC-Nexergy, Inc., Westchester, IL (US)

( * ) Notice: Subject to any disclaimer, the term of this patent is extended or adjusted under 35 U.S.C. 154(b) by 0 days.

(21) Appl. No.: 13/866,466

(22) Filed: Apr. 19, 2013

(65) Prior Publication Data

US 2013/0285598 A1    Oct. 31, 2013

Related U.S. Application Data

(63) Continuation of application No. 10/863,920, filed on Jun. 9, 2004, now Pat. No. 8,436,583.

(51) Int. Cl.
*H02J 7/00* (2006.01)
*H02J 7/14* (2006.01)
*H02J 7/02* (2006.01)

(52) U.S. Cl.
CPC ............. *H02J 7/0013* (2013.01); *H02J 7/0006* (2013.01); *H02J 7/022* (2013.01); *H02J 7/00* (2013.01)
USPC ................. 320/116; 30/116; 30/134; 30/148; 30/124

(58) Field of Classification Search
CPC ..... H02J 7/0011; H02J 7/0013; H02J 7/0008; H02J 7/0014; H02J 7/0003; H02J 7/0026; H02J 7/0024; H02J 7/0042; H02J 7/00
USPC ......... 320/141, 145, 107, 116, 125, 119, 112, 320/124, 127, 132, 134, 133, 135, 136, 137, 320/140, 139, 143
See application file for complete search history.

(56) References Cited

U.S. PATENT DOCUMENTS

| 5,055,763 | A |   | 10/1991 | Johnson et al. |
|---|---|---|---|---|
| 5,218,286 | A | * | 6/1993 | VanDunk ....................... 320/125 |
| 5,519,302 | A |   | 5/1996 | Mino |
| 5,726,551 | A |   | 3/1998 | Miyazaki et al. |
| 5,821,733 | A |   | 10/1998 | Turnbull |
| 5,955,868 | A | * | 9/1999 | Kaite et al. .................... 320/119 |
| 5,998,967 | A | * | 12/1999 | Umeki et al. .................. 320/122 |

(Continued)

*Primary Examiner* — Edward Tso
*Assistant Examiner* — Alexis A Boateng
(74) *Attorney, Agent, or Firm* — John S. Paniaguas; Clark Hill PLC

(57) ABSTRACT

A multiple cell battery charger with a parallel topography is disclosed which requires fewer active components than known battery chargers and protects the battery cells from overcharge and discharge. The charger that includes a regulator for providing a regulated source of direct current (DC) voltage to the battery cells to be charged. Each battery cell is connected in series with a switching device, such as a field effect transistor (FET) and optionally a current sensing device. In a charging mode, the serially connected FET conducts, thus enabling the battery cell to be charged. Battery voltage is sensed by a microprocessor. When the microprocessor senses that the battery cell is fully charged, the FET is turned off, thus disconnecting the battery cell from the circuit. Since the battery cell is disconnected from the circuit, no additional active devices are required to protect the battery cell from discharge.

8 Claims, 7 Drawing Sheets

(56) References Cited

U.S. PATENT DOCUMENTS

| | | |
|---|---|---|
| 6,034,506 A | 3/2000 | Hall |
| 6,313,605 B1 | 11/2001 | Tsenter |
| 6,580,249 B2 | 6/2003 | Yau et al. |
| 6,586,909 B1 | 7/2003 | Trepka |
| 6,741,066 B1 * | 5/2004 | Densham et al. ............. 320/145 |
| 6,888,337 B2 * | 5/2005 | Sawyers ........................ 320/103 |
| 8,436,583 B2 | 5/2013 | Huang |
| 2003/0117109 A1 | 6/2003 | Trepka |
| 2003/0160593 A1 | 8/2003 | Yau et al. |
| 2004/0174139 A1 | 9/2004 | Sawyers |
| 2004/0178766 A1 * | 9/2004 | Bucur et al. .................. 320/112 |

* cited by examiner

MULTIPLE CELL BATTERY CHARGER CONFIGURED WITH A PARALLEL TOPOLOGY

BACKGROUND OF THE INVENTION

1. Field of the Invention

The present invention relates to a battery charger and more particularly, to a battery charger for charging two or more rechargeable battery cells using a parallel battery charger topology, which, as a result uses a reduced number of active components resulting in a relatively less expensive battery charger and at the same time provides the ability to independently control the charging of each of the battery cells.

2. Description of the Prior Art

Various portable devices and appliances are known to use multiple rechargeable battery cells, such as AA and AAA battery cells. In order to facilitate charging of the battery cells for such multiple cell appliances, multiple cell battery chargers have been developed. Both parallel and series topologies are known for such multiple cell battery chargers. For example, U.S. Pat. Nos. 5,821,733 and 6,580,249, as well as published U.S. Patent Application U.S. 2003/0160593, disclose multiple cell battery chargers configured in a series topology. U.S. Pat. Nos. 6,034,506 and 6,586,909 as well as published U.S. Patent Application U.S. 2003/0117109 A1 disclose battery chargers configured in a parallel topology.

In such multiple cell battery chargers configured in a series topology, a series charging current is applied to a plurality of serially coupled battery cells. Because the internal resistance and charge on the individual cells may vary during charging, it is necessary with such battery chargers to monitor the voltage across and/or temperature of each cell in order to avoid overcharging any of the serially connected cells. In the event that an over-voltage condition is sensed, it is necessary to shunt charging current around the cell to prevent overcharging of any of the individual serially connected cells. Thus, such multiple cell battery chargers normally include a parallel shunt around each of the serially connected cells. As such, when a battery cell becomes fully charged, additional charging current is thus shunted around the cell to prevent overcharging and possible damage to the cell. In addition, it is necessary to prevent discharge of such serially connected battery cells when such cells are not being charged.

Various embodiments of a multiple cell battery charger configured with a serial charging topography are disclosed in the '733 patent. In one embodiment, a Zener diode is connected in parallel across each of the serially connected battery cells. The Zener diode is selected so that its breakdown voltage is essentially equivalent to the fully-charged voltage of the battery cell. Thus, when any of the cells become fully charged, the Zener diode conducts and shunts current around that cell to prevent further charging of the battery cell. Unfortunately, the Zener diode does not provide relatively accurate control of the switching voltage.

In an alternate embodiment of the battery charger disclosed in the '733 patent, a multiple cell battery charger with a series topology is disclosed in which a field effect transistors (FET) are used in place of the Zener diodes to shunt current around the battery cells. In that embodiment, the voltage across each of the serially connected cells is monitored. When the voltage measurements indicate that the cell is fully charged, the FET is turned on to shunt additional charging current around the fully charged cell. In order to prevent discharge of battery cells, isolation switches, formed from additional FETs, are used. These isolation switches simply disconnect the charging circuit from the individual battery cells during a condition when the cells are not being charged.

U.S. Pat. No. 6,580,249 and published U.S. Patent Application No. U.S. 2003/01605393 A1 also disclosed multiple cell battery chargers configured in a serial topology. The multiple cell battery chargers disclosed in these publications also include a shunt device, connected in parallel around each of the serially coupled battery cells. In these embodiments, FETs are used for the shunts. The FETs are under the control of a microprocessor. Essentially, the microprocessor monitors the voltage and temperature of each of the serially connected cells. When the microprocessor senses that the cell voltage or temperature of any cell is above a predetermined threshold indicative that the cell is fully charged, the microprocessor turns on the FET, thus shunting charging current around that particular battery cell. In order to prevent discharge of the serially connected cells when no power is applied to the battery charger, blocking devices, such as diodes, are used.

Although such multiple cell battery chargers configured in a series topology are able to simultaneously charge multiple battery cells without damage, such battery chargers am as discussed above, not without problems. For example, such multiple cell battery chargers require at least two active components, namely, either a Zener diode or a FET as a shunt and either a FET or diode for isolation to prevent discharge. The need for at least two active devices drives up the cost of such multiple battery cell chargers.

As mentioned above, U.S. Pat. Nos. 6,034,506 and 6,586,909, as well as U.S. Published Patent Application No. U.S. 2003/0117109, disclose multiple cell battery chargers configured in a parallel topology. U.S. Pat. No. 6,586,909 and published U.S. Application No. U.S. 2003/0117109 disclose a multiple cell battery charger for use in charging industrial high capacity electrochemical batteries. These publications disclose the use of a transformer having a single primary and multiple balanced secondary windings that are magnetically coupled together by way of an induction core. Each battery cell is charged by way of a regulator, coupled to one of the multiple secondary windings. While such a configuration may be suitable for large industrial applications, it is practically not suitable for use in charging appliance size batteries, such as, AA and AAA batteries.

Finally, U.S. Pat. No. 6,034,506 discloses a multiple cell battery charger for charging multiple lithium ion cells in parallel. In particular, as shown best in FIG. 3 of the '506 patent, a plurality of serially connected lithium ion battery cells are connected together forming a module. Multiple modules are connected in series and in parallel as shown in FIG. 2 of the '506 patent. Three isolation devices are required for each cell making the topology disclosed in the '506 patent even more expensive to manufacture than the series battery chargers discussed above. Thus, there is a need for a battery charger which requires fewer active components than known battery chargers and is thus less expensive to manufacture.

SUMMARY OF THE INVENTION

Briefly, the present invention relates to a multiple cell battery charger configured in a parallel topology. In accordance with an important aspect of the invention, the multiple cell battery charger requires fewer active components than known battery chargers, while at the same time preventing overcharge and discharge of the battery cells. The multiple cell battery charger in accordance with the present invention is a constant voltage battery charger that includes a regulator for providing a regulated source of direct current (DC) voltage to the battery cells to be charged. In accordance with the present invention, the battery charger includes a pair of battery terminals that are coupled in series with a switching device, such as a field effect transistor (FET) and optionally a battery cell charging current sensing element, forming a charging circuit. In a charging mode, the serially connected FET conducts, thus enabling the battery cell to be charged. The FETs are controlled by a microprocessor that also monitors the battery cell voltage and optionally the cell temperature. When the microprocessor senses a voltage or temperature indicative that the battery cell is fully charged, the FET is turned off, thus disconnecting the battery cell from the circuit. Once the battery cell is disconnected from the charger by the FET, additional active devices are not required to isolate the battery cell to prevent the battery charger circuit from discharging the battery cell. As such, a single active device such as the FET, provides multiple functions without requiring additional active devices. Accordingly, the battery charger in accordance with the present invention utilizes fewer active components and is thus less expensive to manufacture than known battery chargers configured with a serial topography.

DESCRIPTION OF THE DRAWING

These and other advantages of the present invention will be readily understood with reference to the following specification and attached drawing wherein.

DETAILED DESCRIPTION

The present invention relates to a constant voltage multiple cell battery charger configured to charge multiple battery cells connected in parallel defining a parallel topology. The battery charger, generally identified with the reference 20, includes a power supply 22 and a regulator 24. In an AC application, the power supply 22 is configured to receive a source of AC power, such as 120 volts AC, and convert it to a non-regulated source of DC power by way of a bridge rectifier (not shown), for example. or other device, such as a switched mode power supply. In DC applications, the power supply 22 may simply be a unregulated source of DC, for example in the range of 10 to 16 volts DC, such as a vehicular power adapter from an automobile. The unregulated source of DC power from the power supply 22 may be applies to, for example to a regulator, such as, a DC buck regulator 24, which generates a regulated source of DC power, which, in turn, is applied to the battery cells to be charged.

The regulator 24 may be an integrated circuit (IC) or formed from discrete components. The regulator 24 may be, for example, a switching type regulator which generates a pulse width modulated (PWM) signal at its output. The regulator 24 may be a synchronous buck regulator 24, for example, a Linear Technology Model No. LTC 1736, a Fairchild Semiconductor Model No. RC5057; a Fairchild Semiconductor Model No. FAN5234; or a Linear Technology Model No. LTC1709-85 or others.

The output of the regulator 24 may optionally be controlled by way of a feedback loop. In particular, a total charging current sensing device, such as a sensing resistor R11, may be serially coupled to the output of the regulator 24. The sensing resistor R11 may be used to measure the total charging current supplied by the regulator 24. The value of the total charging current may be dropped across the sensing resistor R11 and sensed by a microprocessor 26. The microprocessor 26 may be programmed to control the regulator 24, as will be discussed in more detail below, to control the regulator 24 based on the state of charge of the battery cells being charged.

Figure 1:
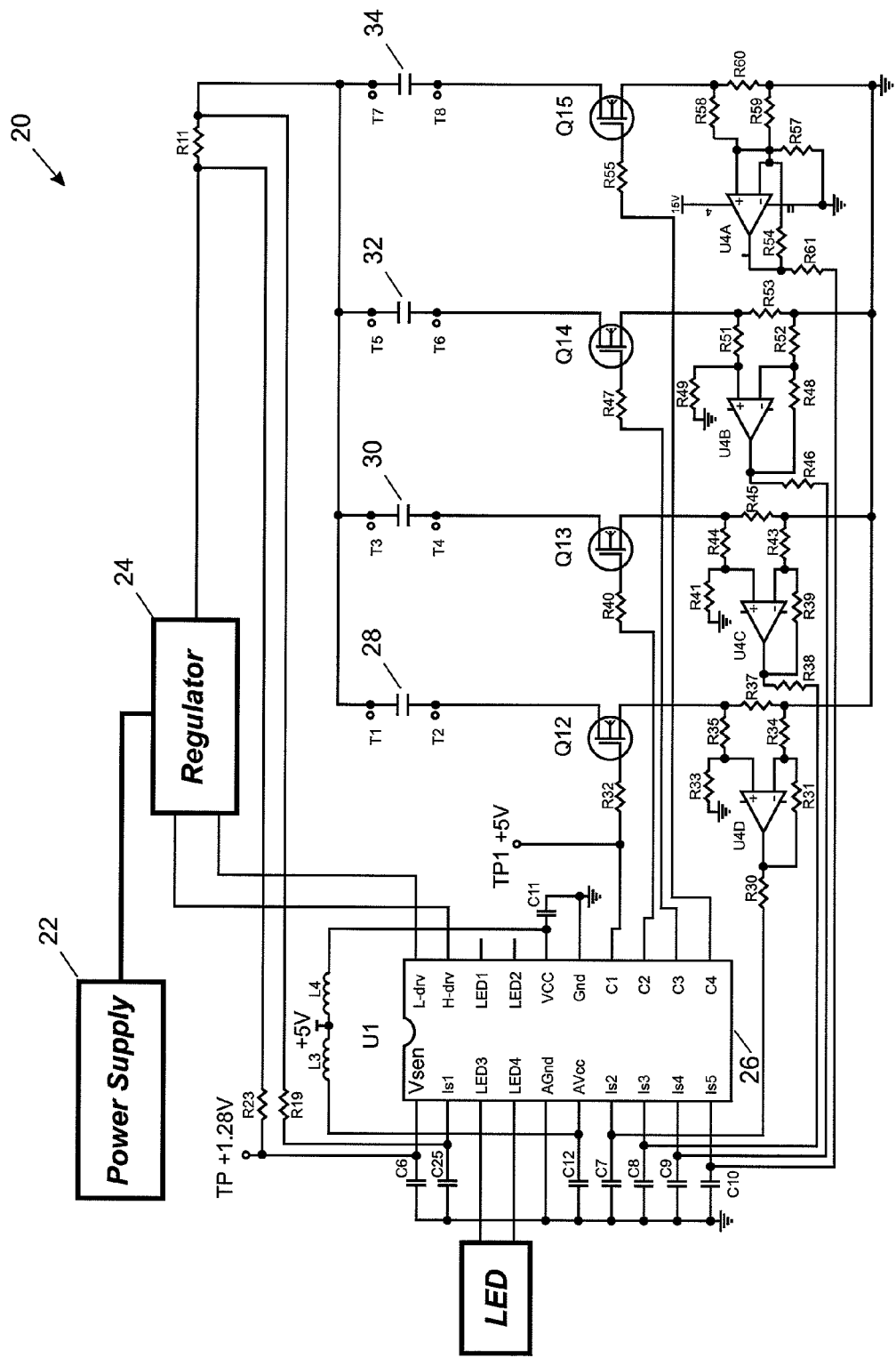
FIG. 1 is a schematic diagram of the battery charger in accordance with the present invention.

As shown in FIG. 1, the battery charger 20 may optionally be configured to charge four battery cells 28, 30, 32, and 34. As shown, these battery cells 28, 30, 32 and 34 are electrically coupled to corresponding pairs of battery terminals: $T_1$ and $T_2$; $T_3$ and $T_4$; $T_5$ and $T_6$; and $T_7$ and $T_8$, respectively. However, the principles of the present invention are applicable to two or more battery cells.

Each battery cell 28, 30, 32 and 34 is serially connected to a switching device, such as a field effect transistor (FET) Q12, Q13, Q14 and Q15. More particularly, the source and drain terminals of each of the FETs Q12, Q13, Q14 and Q15 are serially connected to the battery cells 28, 30, 32 and 34. In order to sense the charging current supplied to each of the battery cells 28, 30, 32 and 34, a current sensing devices, such as the sensing resistors R37, R45, R53, R60, may be serially coupled to the serial combination of the FETs Q12, Q13, Q14 and Q15; and the pairs of battery terminals, $T_1$ and $T_2$; $T_3$ and $T_4$; $T_5$ and $T_6$; and $T_7$ and $T_8$. The serial combination of the battery terminals $T_1$ and $T_2$; $T_3$ and $T_4$; $T_5$ and $T_6$; and $T_7$ and $T_8$; FETs Q12, Q12, Q14 and Q15; and the optional charging current sensing devices R37, R45, R53 and R60, respectively, form a charging circuit for each battery cell 28, 30, 32 and 34. These charging circuits, in turn, are connected together in parallel.

The charging current supplied to each of the battery cells 28, 30, 32 and 34 can vary due to the differences in charge, as well as the internal resistance of the circuit and the various battery cells 28, 30, 32 and 34. This charging current as well as the cell voltage and optionally the cell temperature may be sensed by the microprocessor 26. In accordance with an important aspect of the present invention, the multiple cell battery charger 20 may be configured to optionally sense the charging current and cell voltage of each of the battery cells 28, 30, 32 and 34, separately. This may be done by control of the serially connected FETS Q12, Q13, Q14 and Q15. For example, in order to measure the cell voltage of an individual cell, such as the cell 28, the FET Q12 is turned on while the FETs Q13, Q14 and Q15 are turned off. When the FET 12 is turned on, the anode of the cell 28 is connected to system ground. The cathode of the cell is connected to the Vsen terminal of the microprocessor 26. The cell voltage is thus sensed at the terminal Vsen.

As discussed above, the regulator 24 may be controlled by the microprocessor 26. In particular, the magnitude of the total charging current supplied to the battery cells 28, 30, 32 and 34 may be used to determine the pulse width of the switched regulator circuit 24. More particularly, as mentioned above, the sensing resistor R11 may be used to sense the total charging current from the regulator 24. In particular, the charging current is dropped across the sensing resistor R11 to generate a voltage that is read by the microprocessor 26. This charging current may be used to control the regulator 24 and specifically the pulse width of the output pulse of the pulse width modulated signal forming a closed feedback loop. In another embodiment of the invention, the amount of charging current applied to the individual cells Q12, Q13, Q14 and Q15 may be sensed by way of the respective sensing resistors R37, R45, R53 and R60 and used for control of the regulator 24 either by itself or in combination with the total output current from the regulator 24. In other embodiments of the invention, the charging current to one or more of the battery cells 28, 30, 32 and 34 may be used for control.

In operation, during a charging mode, the pulse width of the regulator 24 is set to an initial value. Due to the differences in internal resistance and state of charge of each of the battery cells 28, 30, 32 and 34 at any given time, any individual cells which reach their fully charged state, as indicated by its respective cell voltage, as measured by the microprocessor 26. More particularly, when the microprocessor 26 senses that any of the battery cells 28, 30, 32 or 34 are fully charged, the microprocessor 26 drives the respective FETs Q12, Q13, Q14, or Q15 open in order to disconnect the respective battery cell 28, 30, 32 and 34 from the circuit. Since the battery cells are actually disconnected from the circuit no additional active devices are required to protect the cells 28, 30, 32 and 34 from discharge. Thus, a single active device per cell (i.e., FETs Q12, Q13, Q14 and Q15) are used in place of two active devices normally used in multiple cell battery chargers configured with a serial topology to provide the dual function of preventing overcharge to individual cells and at the same time protecting those cells from discharge.

As mentioned above, the charging current of each of the battery cells 28, 30, 32 and 34 is dropped across a sensing resistor R37, R45, R53 and R60. This voltage may be scaled by way of a voltage divider circuit, which may include a plurality of resistors R30, R31, R33 and R34, R35, R38, R39, R41, R43, R44, R46, R48, R49, R51, R52, R54, R57, R58, R59, R61, as well as a plurality of operational amplifiers U4A, U4B, U4C and U4D. For brevity, only the amplifier circuit for the battery cell 28 is described. The other amplifier circuits operate in a similar manner. In particular, for the battery cell 28, the charging current through the battery cell 28 is dropped across the resistor R37. That voltage drop is applied across a non-inverting input and inverting input of the operational amplifier U4D.

The resistors R31, R33, R34, and R35 and the operational amplifier U4D form a current amplifier. In order to eliminate the off-set voltage, the value of the resistors R33 and R31 value are selected to be the same and the values of the resistors R34 and R35 value are also selected to be the same. The output voltage of the operational amplifier U4D=voltage drop across the resistor R37 multiplied by the quotient of the resistor value R31 resistance value divided by the resistor value R34. The amplified signal at the output of the operational amplifier U4D is applied to the microprocessor 26 by way of the resistor R30. The amplifier circuits for the other battery cells 30, 32, and 34 operate in a similar manner.

Charge Termination Techniques

The battery charger in accordance with the present invention can implement various charge termination techniques, such as temperature, pressure, negative delta, and peak cut-out techniques. These techniques can be implemented relatively easily by program control and are best understood with reference to FIG. 2. For example, as shown, three different characteristics as a function of time are shown for an exemplary nickel metal hydride (NiMH} battery cell during charging. In particular, the curve 40 illustrates the cell voltage as a function of time. The curves 42 and 44 illustrate the pressure and temperature characteristics, respectively, of a NiMH battery cell under charge as a function of time.

In addition to the charge termination techniques mentioned above, various other charge termination techniques the principles of the invention are applicable to other charge termination techniques as well. For example, a peak cut-out charge termination technique, for example, as described and illustrated in U.S. Pat. No. 5,519,302, hereby incorporated by reference, can also be implemented. Other charge termination techniques are also suitable.

Figure 2:
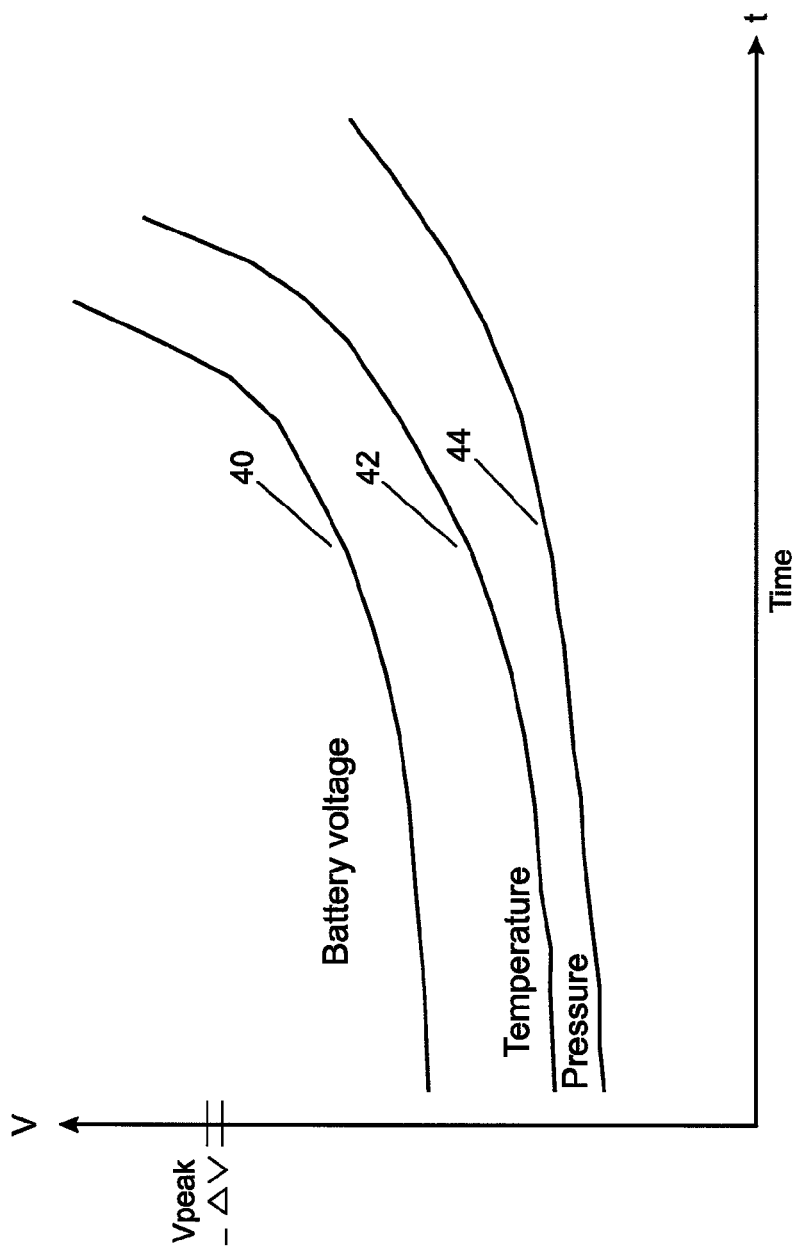
FIG. 2 is a graphical illustration of the voltage, pressure, and/or temperature charging characteristics as a function of time as an exemplary NiMH battery.

FIG. 2 illustrates an exemplary characteristic curve 40 for an exemplary NiMH or NiCd battery showing the relationship among current, voltage and temperature during charge. More particularly, the curve 40 illustrates the cell voltage of an exemplary battery cell-under charge. In response to a constant voltage charge, the battery cell voltage, as indicated by the curve 40, steadily increases over time until a peak voltage value $V_{peak}$ is reached as shown. As illustrated by the curve 44, the temperature of the battery cell under charge also increases as a function of time. After the battery cell reaches its peak voltage $V_{peak}$, continued charging at the increased temperature causes the battery cell voltage to drop. This drop in cell voltage can be detected and used as an indication that the battery's cell is fully charged. This charge termination technique is known as the negative delta V technique.

As discussed above, other known charge termination techniques are based on pressure and temperature. These charge termination techniques rely upon physical characteristics of the battery cell during charging. These charge termination techniques are best understood with respect to FIG. 2. In particular, the characteristic curve 42 illustrates the internal pressure of a NiMH battery cell during charging while the curve 44 indicates the temperature of a NiMH battery cell during testing. The pressure-based charge termination technique is adapted to be used with battery cells with internal pressure switches, such as the Rayovac in-cell charge control $(I-C^3)[1]$. NiMH battery cells, which have an internal pressure switch coupled to one or the other anode or cathode of the battery cell. With such a battery cell, as the pressure of the cell builds up due to continued charging, the internal pressure switch opens, thus disconnecting the battery cell from the charger.

$(I-C^3)$ is a trademark of the Rayovac Corporation.

Temperature can also be used as a charge termination technique. As illustrated by the characteristic curve 44, the temperature increases rather gradually. After a predetermined time period, the slope of the temperature curve becomes relatively steep. This slope, dT/dt may be used as a method for terminating battery charge.

The battery charge in accordance with the present invention can also utilize other known charge termination techniques. For example, in U.S. Pat. No. 5,519,302 discloses a peak cut-out charge termination technique in which the battery voltage and temperature is sensed. With this technique, a load is attached to the battery during charging. The battery charging is terminated when the peak voltage is reached and reactivated as a function of the temperature.

Software Control

Figure 3A:
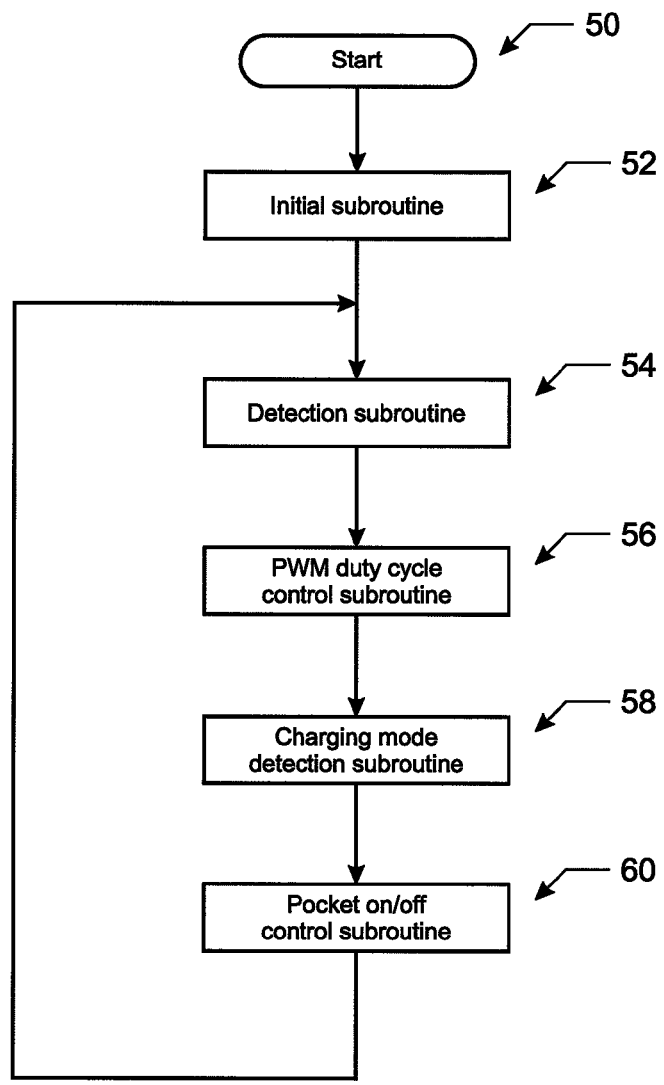
FIGS. 3A-3E illustrate exemplary flow-charts for the battery charger for the present invention.
Figure 3B:
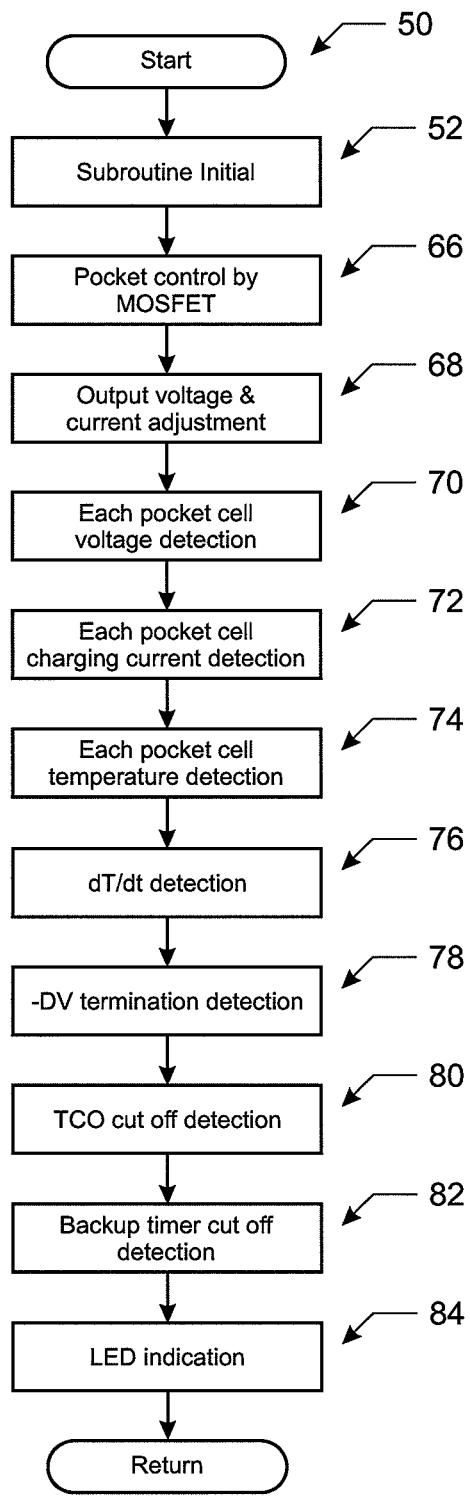

FIGS. 3A-3E illustrate exemplary flow-charts for controlling the battery charger in accordance with the present invention. Referring to the main program, as illustrated in FIG. 3A, the main program is started upon power-up of the microprocessor 26 in step 50. Upon power-up, the microprocessor 26 initializes various registers and closes all of the FETs Q12, Q13, Q14, and Q15 in step 52. The microprocessor 26 also sets the pulse-width of the PWM output of the regulated 24 to a nominal value. After the system is initialized in step 52, the voltages across the current sensing resistors R37, R45, R53, and R60 are sensed to determine if any battery cells are currently in any of the pockets in step 54. If the battery cell is detected in one of the pockets, the system control proceeds to step 56 in which the duty cycle of the PWM out-put of the regulator 24 is set. In step 58, a charging mode is determined. After the charging mode is determined, the microprocessor 26 takes control of the various pockets in step 60 and loops back to step 54.

A more detailed flow-chart is illustrated in FIG. 38. Initially, in step 50, the system is started upon power-up of the microprocessor 26. On start-up, the system is initialized in step 52 as discussed above. As mentioned above, the battery charger in accordance with the present invention includes two or more parallel connected charging circuits. Each of the charging circuits includes a switching device, such as a MOSFETs Q12, Q13, Q14, or Q15, serially coupled to the battery terminals. As such, each charging circuit may be controlled by turning the MOSFETs on or off, as indicated in step 66 and discussed in more detail below. In step 68, the output voltage and current of the regulator 24 is adjusted to a nominal value by the microprocessor 26. After the regulator output is adjusted, a state of the battery cell is checked in step 70. As mentioned above, various charge termination techniques can be used with the present invention. Subsequent to step 70, the charging current is detected in step 72 by measuring the charging current dropped across the current sensing resistors R37, R45, R53, or R60.

One or more temperature based charge termination techniques may be implemented. If so, a thermistor may be provided to measure the external temperature of the batter cell. One such technique is based on dT/dt. Another technique relates to temperature cutoff. If one or more of the temperature based techniques are implemented, the temperature is measured in step 74. If a dT/dt charge termination technique is utilized, the temperature is taken along various points along the curve 44 (FIG. 2) to determine the slope of the curve. When the slope is greater than a predetermined threshold, the FET for that cell is turned off in step 76.

As mentioned above, the system may optionally be provided with negative delta V charge termination. Thus, in step 78, the system may constantly monitor the cell voltage by turning off all but one of the switching devices Q12, Q13, Q14, and Q15 and measuring the cell voltage along the curve 40 (FIG. 2). When the system detects a drop in cell voltage relative to the peak voltage Vsen, the system loops back to step 66 to turn off the switching device Q12, Q13, Q14, and Q15 for that battery cell.

As mentioned above, a temperature cut-out charge termination technique may be implemented. This charge termination technique requires that the temperature of the cells 28, 30, 32 and 34 to be periodically monitored. Should the temperature of any the cells 28, 30, 32 and 34 exceed a predetermined value, the FET for that cell is turned off in step 80. In step 82, the charging time of the cells 28, 30, 32, and 34 is individually monitored. When the charging time exceeds a predetermined value, the FET for that cell is turned off in step 82. A LED indication may be provided in step 84 indicating that the battery is being charged.

Figure 3C:
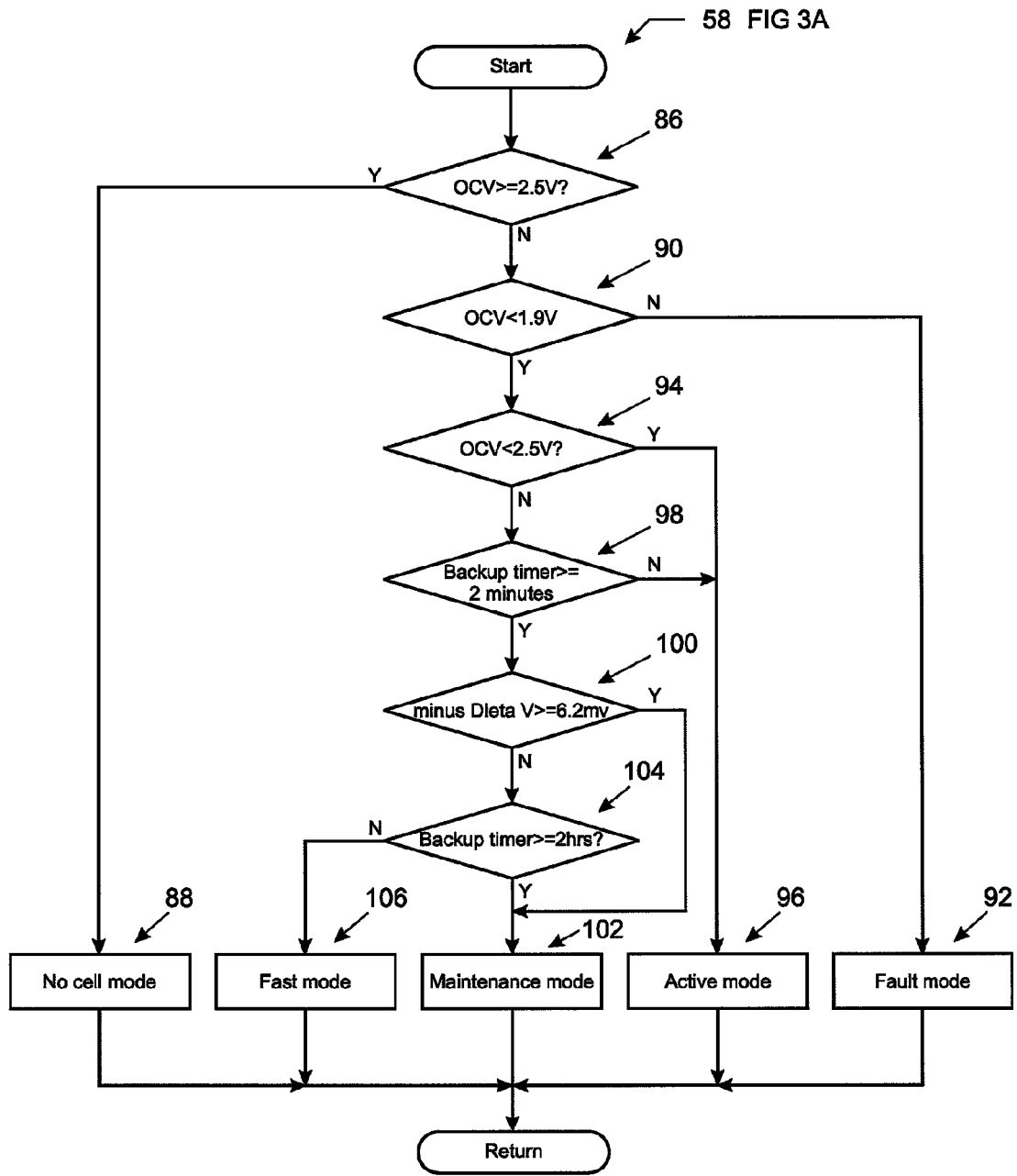
Figure 3D:
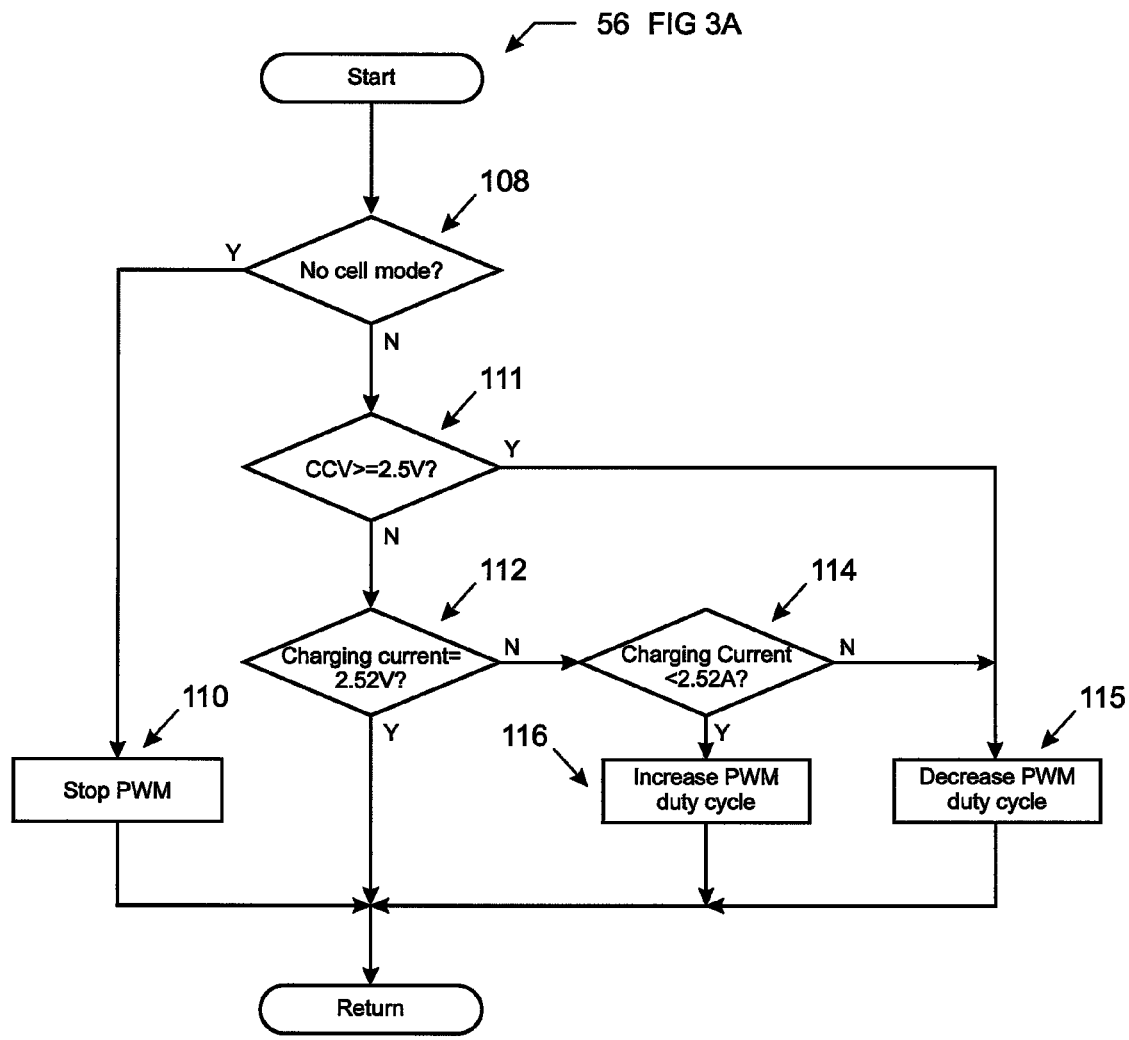

FIG. 3C illustrates a subroutine for charging mode detection. This subroutine may be used to optionally indicate whether the battery charger 20 is in a "no-cell" mode; "main-charge" mode; "maintenance-charge" mode; an "active" mode; or a "fault" mode. This subroutine corresponds to the block 58 in FIG. 3A. The system executes the charging mode detection subroutine for each cell being charged. Initially, the system checks in step 86 the open-circuit voltage of the battery cell by checking the voltage at terminal Vsen of the microprocessor 26. If the open-circuit voltage is greater than or equal to a predetermined voltage, for example, 2.50 volts, the system assumes that no battery cell is in the pocket, as indicated in step 88. If the open-circuit voltage is not greater than 2.50 volts, the system proceeds to step 90 and checks whether the open-circuit voltage is less than, for example, 1.90 volts. If the open circuit voltage is not less than 1.90 volts, the system indicates a fault mode in step 92. If the open-circuit voltage is less than 1.90 volts, the system proceeds to step 94 and checks whether the open-circuit voltage is less than, for example, 0.25 volts. If so, the system returns an indication that the battery charger is in inactive mode in step 96. If the open-circuit voltage is not less than, for example, 0.25 volts, the system proceeds to step 98 and checks whether a back-up timer, is greater than or equal to, for example, two minutes. If not, the system returns an indication that battery charger 20 is in the active mode in step 96. If the more than, for example, two minutes has elapsed, the system checks in step 100 whether the battery cell voltage has decreased more than a predetermined value, for example, 6.2 millivolts. If so, the system returns an indication in step 102 of a maintenance mode. If not, the system proceeds to step 104 and determines whether the back-up timer is greater or equal to a maintenance time period, such as two hours. If not, the system returns an indication in step 106 of a main charge mode. If more than two hours, for example has elapsed, the system returns an indication in step 102 of a maintenance mode.

FIG. 30 illustrates a subroutine for the PWM duty cycle control. This subroutine corresponds to block 56 in FIG. 3A. This subroutine initially checks whether or not a cell is present in the pocket in step 108 as indicated above. If there is no cell in the pocket, the duty cycle of the PWM is set to zero in step 110. When there is a battery cell being charged, the PWM output current of the regulator 24 is sensed by the microprocessor 26 by way of sensing resistor R11. The microprocessor 26 uses the output current of the regulator 24 to control the PWM duty cycle of the regulator 24. Since the total output current from the regulator 24 is dropped across the resistor R11, the system checks in step 111 whether the voltage Vsen is greater than a predetermined value, for example, 2.50 volts in step 111. If so, the PWM duty cycle is decreased in step 115. If not, the system checks whether the total charging current for four pockets equal a predetermined value. If so, the system returns to the main program. If not, the system checks in step 114 whether the charging current is less than a preset value. If not, the PWM duty cycle is decreased in step 115. If so, the PWM duty cycle is increased in step 116.

Figure 3E:
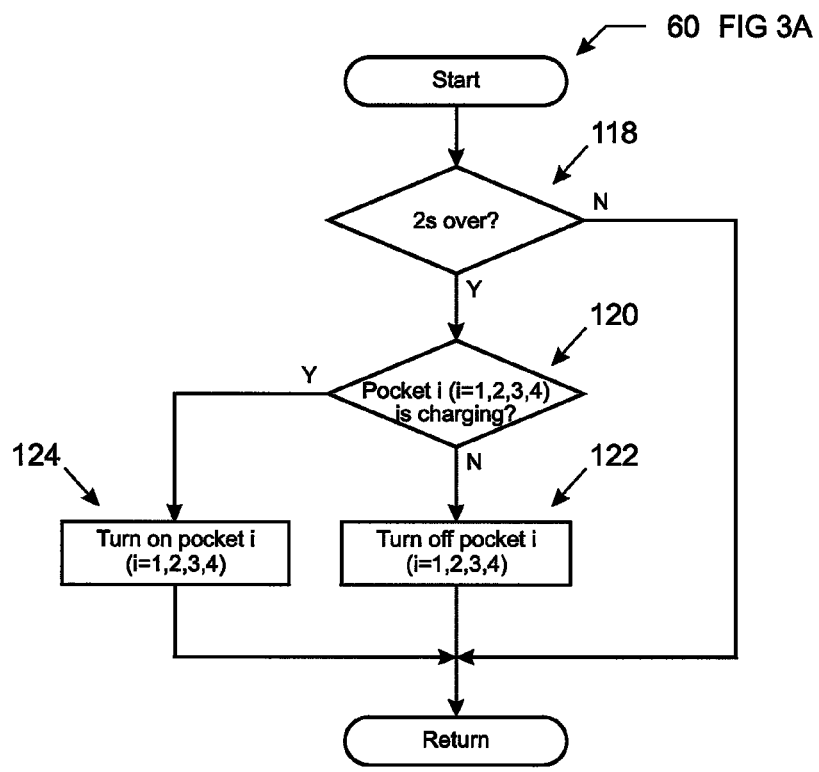

The pocket on-off subroutine is illustrated in FIG. 3E. This subroutine corresponds to the block 60 in FIG. 3A. Initially, the system checks in step 118 whether the battery cell in the first pocket (i.e. channel 1) has been fully charged. If not, the system continues in the main program in FIG. 3A, as discussed above. If so, the system checks in step 120 which channels (i.e pockets) are charging in order to take appropriate action. For example, if channel 1 and channel 2 are charging and channel 3 and channel 4 are not charging, the system moves to step 122 and turns off channel 3 and channel 4, by turning off the switching devices Q14 and Q15 and moves to step 124 and turns on channel 1 and channel 2, by turning on the switching device Q12 and Q13.

The channels refer to the individual charging circuits which include the switching devices Q12, Q13, Q14, and Q15. The channels are controlled by way of the switching devices Q12, Q13, Q14 or Q14 being turned on or off by the microprocessor 26.

Obviously, many modifications and variations of the present invention are possible in light of the above teachings. Thus, it is to be understood that, within the scope of the appended claims, the invention may be practiced otherwise than as specifically described above.

What is claimed and desired to be secured by a Letters Patent of the United States is:

1. A multiple cell battery charger comprising:
   a regulator for receiving a predetermined input voltage and supplying a regulated supply of DC voltage;
   a plurality of charging circuits, each charging circuit formed to charge at least one battery cell, said plurality of charging circuits electrically coupled to each other in a parallel relationship forming a parallel circuit, said parallel circuit being electrically coupled to said regulator and connected in parallel with each other, each charging circuit comprising;
      a pair of terminals for coupling to said at least one battery cell;
      a switching device serially coupled to said pair of battery terminals for selectively connecting and disconnecting said pair of terminals from said regulator; and
      a current sensing device for sensing the charging current applied to said at least one battery cell, wherein said current sensing device, said switching device and said pair of terminals are all connected in series forming said charging circuit;
   a microprocessor operatively coupled to said charging circuits for selectively monitoring the voltage across the pair of terminals in each charging circuit independently and selectively controlling the switching device so as to disconnect said pair of terminals in an individual charging circuit when said at least one battery cell in that individual charging circuit reaches a predetermined voltage.

2. The original multiple cell battery charger as recited in claim 1, wherein said regulator is a switching regulator with a selectable pulse width modulated output signal.

3. The multiple cell battery charger as recited in claim 2, selectable pulse width modulated (PWM) output signal is under the control of said microprocessor which varies the pulse width of said PWM output signal as a function of the magnitude of said the total charging current supplied by said regulator forming a closed feedback loop.

4. The multiple cell battery charger as recited in claim 1, wherein said predetermined input voltage to said regulator is AC.

5. The multiple cell battery charger as recited in claim 1, wherein said predetermined input voltage is DC.

6. The multiple cell battery charger as recited in claim 1, wherein said switching device is a field effect transistor having gate, drain and source terminals, wherein said drain and source terminals are serially coupled to said individual cell current sensing resistor and said battery cell terminals and said gate terminal is electrically coupled to said regulator.

7. The multiple cell battery charger as recited in claim 1, wherein said regulator is an integrated circuit.

8. A multiple cell battery charger comprising:
   a regulator for receiving a predetermined input voltage and supplying a regulated supply of DC voltage;
   a plurality of charging circuits, each charging circuit formed to charge at least one battery cell, said plurality of charging circuits electrically coupled to each other in a parallel relationship forming a parallel circuit, said parallel circuit being electrically coupled to said regulator and connected in parallel with each other, each charging circuit comprising;
      a pair of terminals for coupling to said at least one battery cell;
      a switching device serially coupled to said pair of battery terminals for selectively connecting and disconnecting said pair of terminals from said regulator; and
      a current sensing device for sensing the charging current applied to said at least one battery cell, wherein said current sensing device, said switching device and said pair of terminals are all connected in series forming said charging circuit;
   a processing device operatively coupled to said charging circuits for selectively monitoring the voltage across the pair of terminals in each charging circuit independently and selectively controlling the switching device so as to disconnect said pair of terminals in an individual charging circuit when said at least one battery cell in that individual charging circuit reaches a predetermined voltage.

* * * * *